US008079065B2

(12) United States Patent
Sacson et al.

(10) Patent No.: US 8,079,065 B2
(45) Date of Patent: Dec. 13, 2011

(54) INDEXING ENCRYPTED FILES BY IMPERSONATING USERS

(75) Inventors: Ilia Sacson, Bellevue, WA (US); Michael Novak, Redmond, WA (US); Christopher Clayton McConnell, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 722 days.

(21) Appl. No.: 12/163,613

(22) Filed: Jun. 27, 2008

(65) Prior Publication Data

US 2009/0327749 A1 Dec. 31, 2009

(51) Int. Cl.
*G06F 7/04* (2006.01)
*G06F 21/00* (2006.01)

(52) U.S. Cl. .............................. 726/4; 707/741; 726/26

(58) Field of Classification Search .............. 705/50–63; 707/673, 696, 711, 736, 741–747, 830; 726/26–36
See application file for complete search history.

(56) References Cited

U.S. PATENT DOCUMENTS 6,249,866 B1 6/2001 Brundrett
7,043,637 B2 5/2006 Bolosky
7,203,711 B2 4/2007 Borden
7,280,956 B2 10/2007 Cross
2002/0174355 A1 11/2002 Rajasekaran
2004/0086124 A1 5/2004 Sasaki
2004/0158527 A1* 8/2004 Lambert ........................ 705/51
2007/0016546 A1 1/2007 DeVorchik
2007/0136340 A1 6/2007 Radulovich
2007/0156778 A1 7/2007 Archer
2007/0208733 A1 9/2007 Brault
2008/0130630 A1* 6/2008 Shim et al. .................... 370/352
2008/0154622 A1* 6/2008 El Kadri et al. .................. 705/1
2009/0157829 A1* 6/2009 Choi et al. .................... 709/206

OTHER PUBLICATIONS

EFS, Encrypting File System http://prowiki.isc-csg.upenn.edu/index.php/EFS,_Encrypting_File_System.
Windows Desktop Search http://www.microsoft.com/windows/products/winfamily/desktopsearch/choose/windowsdesktopsearch.mspx.
Indexing Encrypted Files in Vista http://www.tipstrs.com/tip/2499/Indexing-encrypted-files-in-Vista.

* cited by examiner

*Primary Examiner* — Gilberto Barron, Jr.
*Assistant Examiner* — Malcolm Cribbs
(74) *Attorney, Agent, or Firm* — Shook, Hardy & Bacon

(57) ABSTRACT

Methods and computer-readable media for indexing an encrypted file by impersonating a user is provided. A set of keys may be associated with a particular encrypted file. Once these keys are identified, the users who own these keys may then be identified by consulting an association of keys to users, which may be updated immediately upon the addition of new keys. If one of the users is currently logged on, the logon information associated with that user may be used to access the content of the encrypted file. The encrypted file may then be indexed based on the accessed content. To allow more than one user to use the same index, security identifiers may be assigned to index records associated with encrypted files to protect content of encrypted files from unauthorized users.

20 Claims, 5 Drawing Sheets

MEMORY
112
I/O PORT(S)
118
PROCESSOR(S)
114
I/O COMPONENTS
120
PRESENTATION COMPONENT(S)
116
POWER SUPPLY
122
100
110

INDEXING ENCRYPTED FILES BY IMPERSONATING USERS

BACKGROUND

Typically, products that search and index files and other content on a computer or network of computers run as regular programs, and require that the user be logged on in order for indexing to occur. If the user is not logged on, the indexing program may not be able to access any of the data on the computer. If there are multiple users on the same computer or computer network, an index may be created for each user, as users typically possess different access rights and privileges. As the number of users increases on the same computer or computer network, the cost of creating the indexes also increases if an index is created for every user. In addition, the indexer may be required to index the same files multiple times. This is not only inefficient, but is not cost effective, and therefore there is room for improvement.

SUMMARY

Embodiments of the present invention relate to methods and computer-readable media for indexing an encrypted file by impersonating a user associated with the encrypted file. Once determined that a file is encrypted, one or more keys associated with the encrypted file are associated with one or more users who are able to access and decrypt the encrypted file. It may be determined whether any of the users are currently logged on, and if so, one of the logged on user's logon information, such as a logon token, may be used to impersonate that user and access content of the encrypted file. The encrypted file may then be indexed. Security identifiers may be used to protect the indexed information from users who do not have appropriate permission to access and decrypt the encrypted file.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention are described in detail below with reference to the attached drawing figures, wherein.

DETAILED DESCRIPTION

Figure 1:
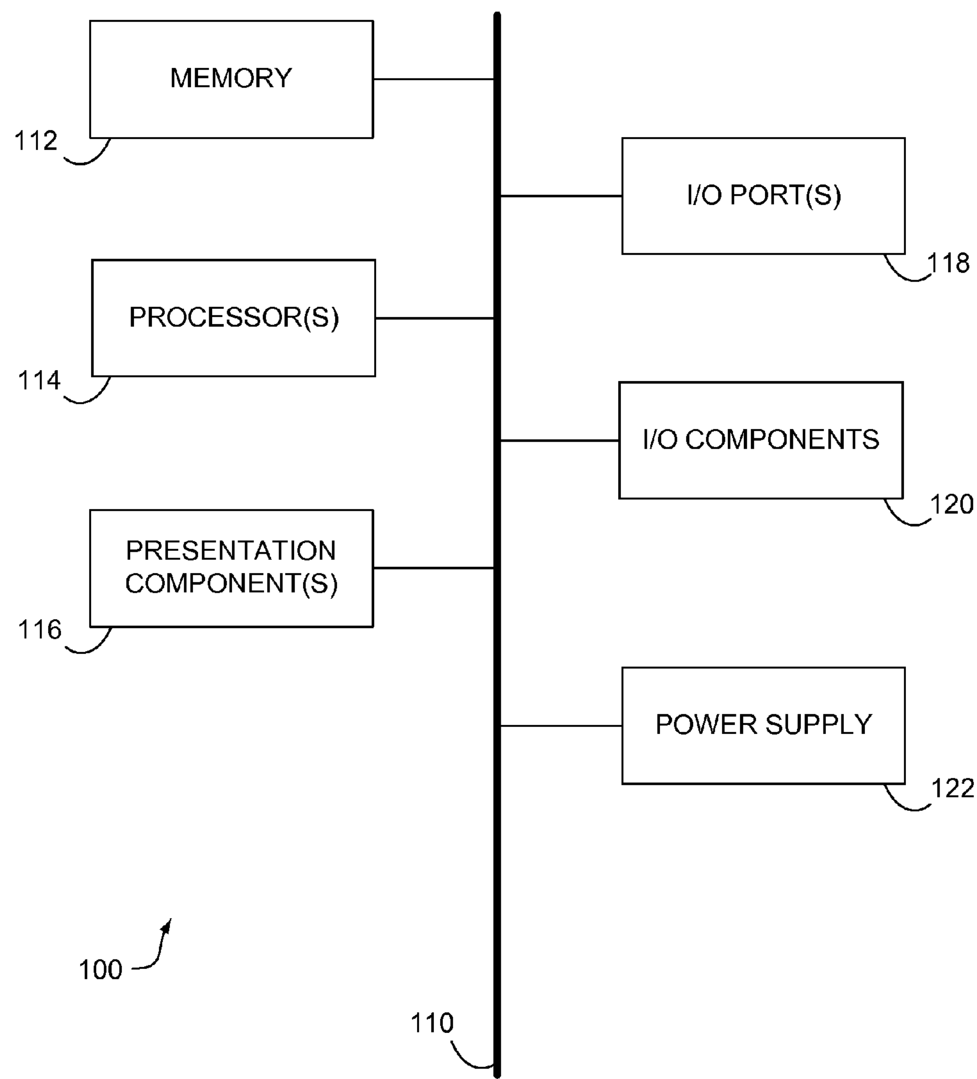
FIG. 1 is a block diagram of an exemplary computing environment suitable for use in implementing the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to methods for accessing content of encrypted files and indexing the content by impersonating a user who is determined to be logged on. Each file that is determined to be encrypted has one or more keys associated with it, and each key allows for access to the encrypted file. In order to determine the users who can access and decrypt the encrypted files, the keys are mapped to associated users in a register, which is updated immediately upon new keys being added. If one of the users is logged on, logon information for that user is used to impersonate the user and access, and therefore index the content of the encrypted file.

In one aspect, a computer-implemented method for indexing an encrypted file by impersonating a user associated with the encrypted file is provided. The method includes receiving a determination that a file is encrypted, receiving identifying information for one or more users, wherein the users correspond to one or more keys associated with the encrypted file, and determining that at least one of the one or more users is logged on. Further, the method also includes receiving content of the encrypted file and indexing the encrypted file based on at least a portion of the received content.

In another aspect, a computer-implemented method for accessing content of an encrypted file by impersonating users associated with the encrypted file is provided. The method includes determining that a file is encrypted, determining one or more keys associated with the encrypted file, associating the one or more keys with one or more users, and receiving a determination that at least one of the one or more users are logged in. In addition, the method includes receiving logon information for the at least one of the one or more users determined to be logged on and using the logon information, accessing content of the encrypted file.

In yet another aspect, one or more computer-readable media having computer-executable instructions embodied thereon that, when executed, perform a method for indexing an encrypted file by impersonating a user associated with the encrypted file is provided. The method includes initiating indexing of a directory containing a plurality of files, receiving an indication that one of the plurality of files in the directory is encrypted, determining one or more keys associated with the encrypted file, associating the one or more keys with one or more users, and determining if at least one of the one or more users is logged on. Further, the method includes if it is determined that the at least one of the one or more users is logged on, performing the steps of associating the identifying information of a logged on user with logon information for the logged on user, accessing the encrypted file using the logon information from the logged on user, and indexing the encrypted file.

Having briefly described an overview of exemplary embodiments of the present invention, an exemplary operating environment for the present invention is now described.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components/modules illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implements particular abstract data types. Embodiments of the present invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer" or "computing device."

Computer 100 typically includes a variety of computer-readable media. Computer-readable media can be any available media that can be accessed by computer 100 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display, speaker, printing component, vibrating component, etc.

I/O ports 118 allow computing device 100 to be logically coupled to other devices, including I/O components 120, some of which may be built in. Illustrative components include a microphone, joystick, game pad, satellite dish, scanner, printer, wireless device, etc.

Figure 2:
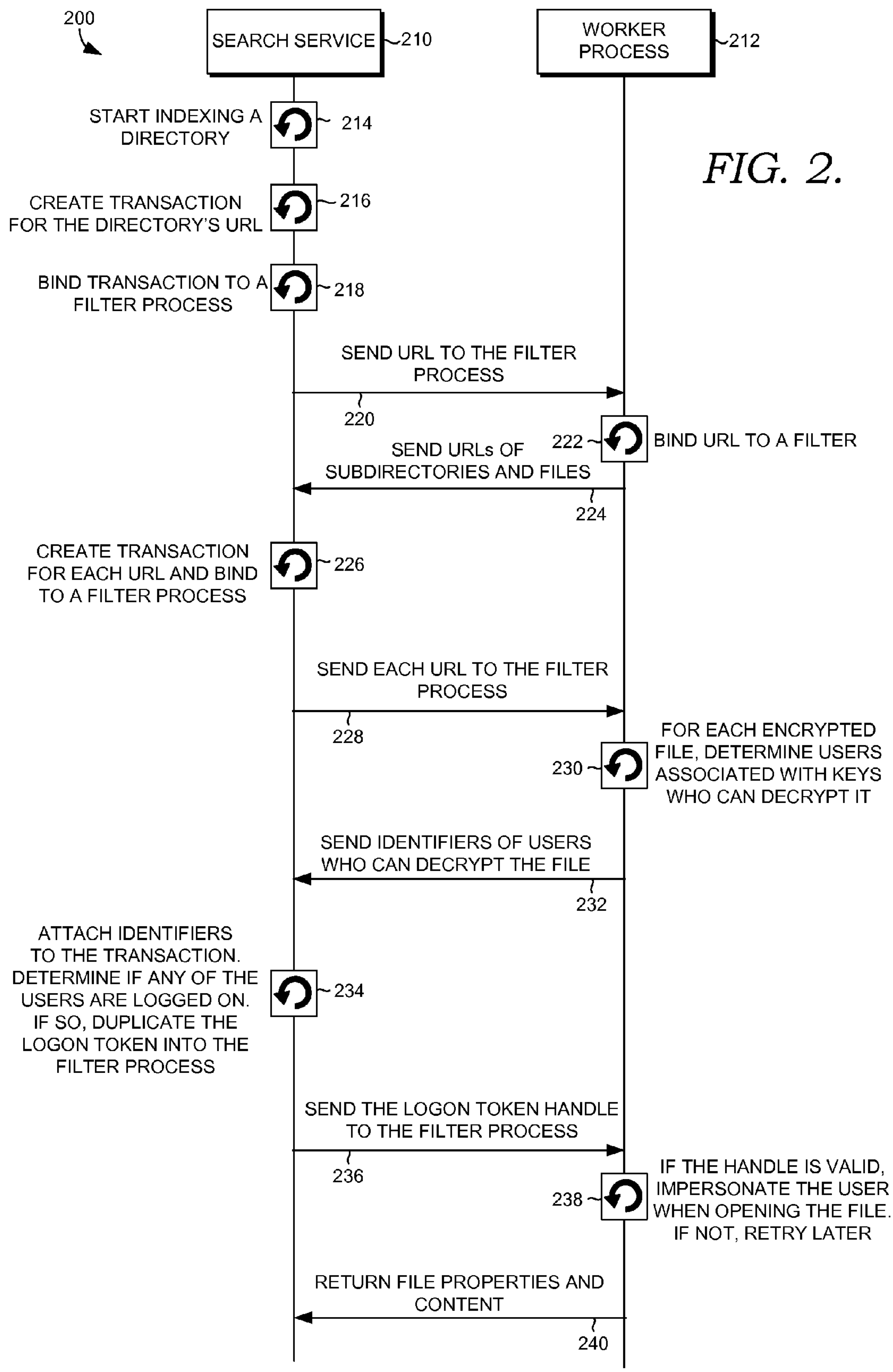
FIG. 2 is a flow diagram of a method for accessing content of an encrypted file by impersonating a user associated with the encrypted file, in accordance with an embodiment of the present invention.

Referring now to FIG. 2, a flow diagram is illustrated of a method 200 for accessing content of an encrypted file by impersonating a user associated with the encrypted file, in accordance with an embodiment of the present invention. An encrypted file may be unreadable to anyone except those possessing special knowledge, which may be in the form of a key. Encrypting a file may protect the confidentiality of a message or other information contained within a file. In the embodiment of FIG. 2, there are two processes that work together to access content of an encrypted file so that the content can be indexed. Here, there is a search service 210 and a worker process 212. Generally, search service 210 is the coordinator of the indexing process, while worker process 212 may actually access the data from encrypted files. Although FIG. 2 is illustrated as having two separate processes, it will be appreciated to one of ordinary skill in the art that any number of processes may be used to achieve the same result, even using just one process.

Initially, at step 214, indexing of a directory is initiated. An indexer may receive an entry point, or a start address, where the indexer will begin its search for new files and data. For example, a start address may be a local drive of a computer or a network of computers (e.g., c:/users). The entry point, in many embodiments, is a place, or location on a computer. Next, at step 216, a transaction is created for the directory's location on a local drive or on a network. The directory may be identified by a uniform resource locator (URL), or path, for example. URLs provide a means of locating the resource, such as a directory, by describing its primary access mechanism. A transaction is a bookkeeping device, or a record, that identifies a file in processing, and contains an item identity, such as what is being indexed (e.g., directory), file names, and the stage at which indexing is currently at. A transaction may also contain data associated with the item being indexed.

Step 218 binds the transaction created at step 216 to a filter process, which essentially begins the process of searching for files to index. In this embodiment, a filter process, which may be separate from either search service 210 or worker process 212 is responsible for filtering the files in the directory. In another embodiment, another process, such as worker process 212 or any other process may have the responsibility of filtering the files. These other embodiments are considered to be within the scope of the present invention, as FIG. 2 is presented for illustrative purposes only. At step 220, the location of the directory, such as the URL or path, is sent to worker process 212, which essentially tells worker process 212 to begin crawling the files associated with the URL so that worker process 212 may later return the results of what it found to search service 210. Next, worker process 212 may bind the URL to a filter at step 222 so that search service 210, when it receives the results of the search, will understand which directory was searched, or filtered, as the directory may be located or identified by its URL. At step 224, the URLs of any subdirectories found in the directory and any files found are sent back to search service 210.

Search service 210 then creates a transaction for each URL by binding each URL to a filter process at step 226. Each URL is then sent back to the filter process at step 228. It may then be determined whether any of the files are encrypted. If it is determined that a file is encrypted, it is determined, at step 230, who can decrypt it. Thus, each user who has the capability to decrypt the encrypted file is identified at step 230. There may be more than one user who is able to decrypt the encrypted file. This may be done, in one embodiment, by first identifying or determining one or more keys associated with the encrypted file. A mapping is kept of log on information, such as, but not limited to, keys or certificate key hashes, to users, and therefore if keys or certificate key hashes associated with the encrypted file are identified, the users to whom the keys belong may also be identified. In addition, when a user logs on to a computer, for example, a new key may be used. The mapping may be updated when a new key is added, or when a key is no longer used, such that the system has the most up-to-date mappings of keys to user associations. This updating process may happen immediately after a change occurs, instead of updating only at certain times. In that scenario, the user may have logged on and used a new key and the new key may not be updated in the mapping.

Once users who can decrypt the encrypted file are identified, identifiers of these users are sent back to search service 210 at step 232. These identifiers may include any type of information that identifies the users and may be as simple as the user's logon information (e.g., username) or just the user's name. The search service 210 may attach these identifiers to the transaction at step 234 so that if it is later determined that none of the users are logged on, it is known which users are associated with the encrypted file. It may be attempted to match a newly logged on user with a user associated with a particular encrypted file so that the contents of the file may be accessed. Attaching identifiers to the transaction also allows users, who can decrypt the encrypted file, to be properly kept track of during this process. In addition, search service 210 may determine if any of the users are logged on at the time the users' identifiers are received. If one or more of the users are logged in, one user is chosen, and that user's logon token is duplicated by search service 210 into the filter process. A logon token may contain security information about users who have logged on and have been authenticated and may also identify the user, the user's groups, and the user's privileges. If it is determined that none of the users are logged on, worker process 212 or another process may not be able to access the encrypted file, and thus search service 210 may wait for a predetermined period of time and then once again determine if any of the users are logged on. Further, if it is determined that none of the users are currently logged on, an invalid handle value may be sent, which indicates that the system should try again at a later time to acquire a valid handle value. This may be accomplished by waiting for a user to log on, and once logged on, attempting to match the newly logged on user with an identifier that has been attached to a particular transaction. This increases efficiency of accessing content of an encrypted file by avoiding the need to repeat steps already taken to identify users associated with the encrypted file.

At step 236, the logon token handle is sent from search service 210 to the filter process, which is illustrated in FIG. 2 as a component of worker process 212. In other embodiments, however, the filter process may be a separate process not included within worker process 212. A logon token handle allows for access to the logon token.

At step 238, it is determined if the handle is valid. If the handle is found to be valid, the user may then be impersonated when worker process 212 opens the encrypted file. If the handle is not valid, an error code may appear (e.g., "retry indefinitely"). An invalid handle may indicate that none of the users associated with the encrypted file are currently logged on. The process responsible for opening the encrypted file (e.g., worker process 212 or filter process) will try to open the file again at a later time, such as a predetermined amount of time. Once the encrypted file has been opened and its contents have been retrieved at step 238, the file properties and contents of the encrypted file are returned to search service 210 at step 240. As the contents of the encrypted file are not available to search service 210, it may index the content of the encrypted file, as well as other files.

Although the contents of the encrypted file have now been indexed, caution may be taken in determining which users have access to the indexed information of the encrypted file or files, in particular. Each file that is indexed may have an associated index record in the index. The index records associated with encrypted files may be protected by a security identifier, which may allow read access only to those users who have the capabilities to both decrypt and access the file. This prevents users who do not have both capabilities from accessing data that is encrypted (e.g., dictionary attack). A dictionary attack takes every word in a dictionary and queries a computer for every file that contains each word. If an index record associated with an encrypted file is not protected by a security identifier, for example, a dictionary attack may allow a user without appropriate permission to access all or a portion of the contents of an encrypted file. For this reason, security identifiers may be used to protect indexed content of an encrypted file. An Access Control List (ACL) may provide a list of users and their respective permissions. When a user attempts to access indexed content associated with an encrypted file, the system may consult the ACL to determine whether the user has appropriate permissions. If not, the content will not be available to the user. The reason for requiring both access and decrypt permissions is to prevent incidents similar to the dictionary attack, where a user may only have access permission, which is insufficient to allow the user to read the content of the encrypted file.

Figure 3:
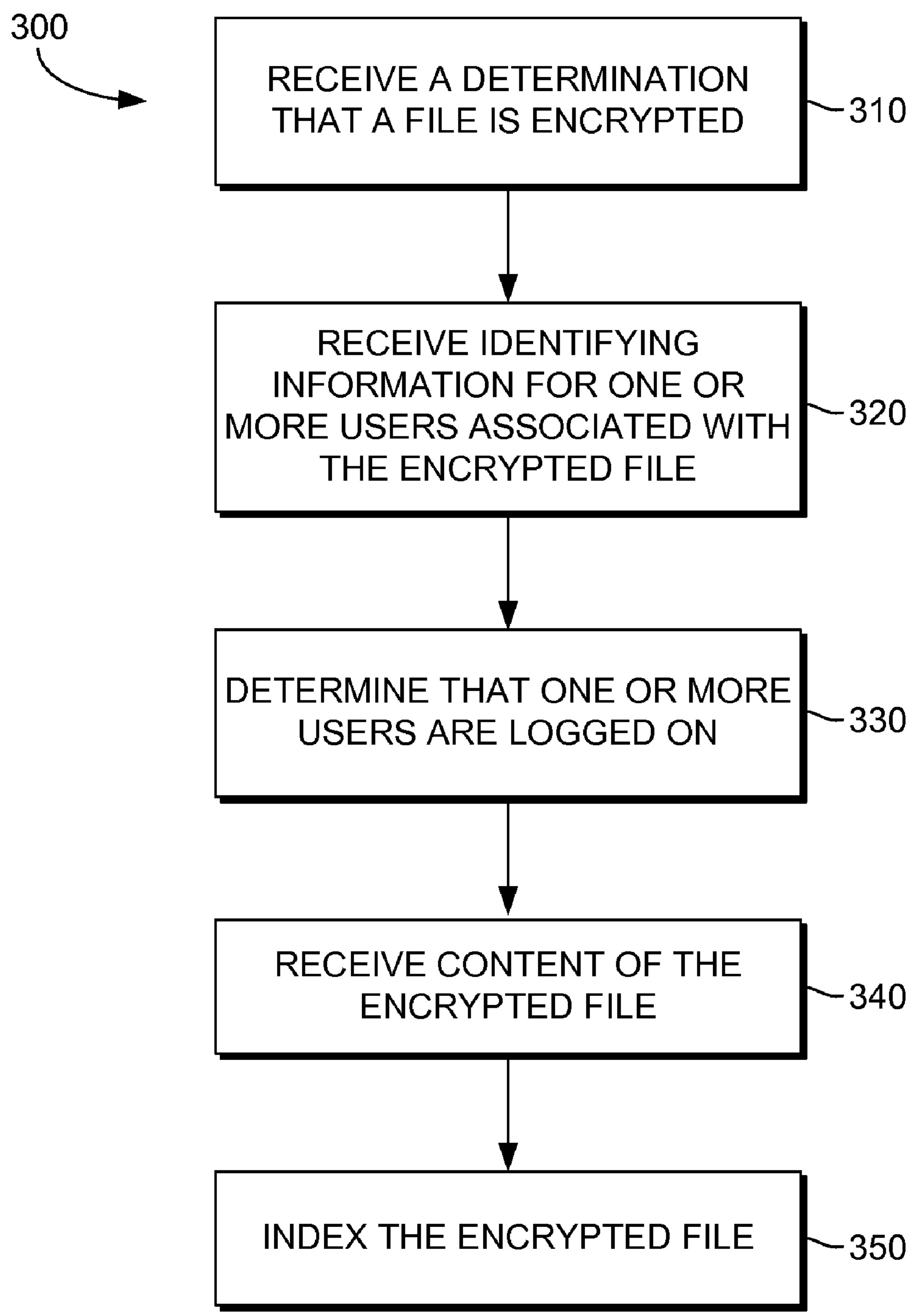
FIG. 3 is a flow diagram illustrating a method for indexing an encrypted file by impersonating a user associated with the encrypted file, in accordance with an embodiment of the present invention.

Turning now to FIG. 3, a flow diagram is shown illustrating a method 300 for indexing an encrypted file by impersonating a user associated with the encrypted file, in accordance with an embodiment of the present invention. While FIG. 3 represents steps taken by search service 210, it should be appreciated by one skilled in the art that any system or process may perform one or more of the steps illustrated in FIG. 3. In addition, the system or process providing information to search service 210 may be done by worker process 212 in one embodiment, or by any other system or process in other embodiments.

Initially, indexing of a directory may be initiated, wherein the directory may contain one or more files and/or subdirectories. A directory transaction may be created for the location of the directory prior to the directory being crawled by one or more of the processes described herein. Once files are located, a file transaction may be created for each of the files in the directory. Alternatively, as notification may be received that a file in a directory or elsewhere has somehow changed, which indicates that it needs to be indexed again, or even for the first time. A file may have changed if its security attributes have changed, if file attributes have changed, if file content has changed, if the file was not encrypted but became encrypted, if the certificate key hash has been added to or removed from a file, and the like.

As shown in FIG. 3, a determination that a file is encrypted is received at step 310. In one embodiment, search service 210 of FIG. 2 makes that determination, and conveys the determination to worker process 212, for example, although other processes may make and receive this determination. At step 320, identifying information is received for one or more users associated with the encrypted file. The users may be determined in more than one way. For example, there may be one or more keys associated with the encrypted file. A key may be referred to as special knowledge belonging to one or more users who are able to access and/or decrypt an encrypted file. Generally, one key may be associated or may belong to one or more users, and a user may own or be associated with more than one key. Here, as shown at step 320, search service 210 receives identifying information for one or more users, which may be any type of information, such as, but not limited to a user's name or information about the key.

Further, as previously described, the present invention provides for a mapping to be kept and updated as soon as a new key is used by a user. The mapping, or list, is immediately updated so that a new key is not overlooked. Once the one or more keys are associated with the encrypted file, the keys can then be associated with one or more users using the mapping. An Encrypted File System (EFS) may not be aware of individual users, as it operates with certificates. As the indexer may run as a system service, it only owns the system certificate, which does not allow decrypting users' files. The indexer does keep track of which user owns which certificates, and corresponding keys, and caches this association in the mapping. When accessing an encrypted file, the indexer may read the list of certificates and use the association of certificates and keys to users to determine which user of those logged on should be impersonated to decrypt the file's content.

At step 330, it is determined that at least one of the one or more users are logged on. This determination may be made by search service 210 in one embodiment, but another process in another embodiment. Once determined, content of the encrypted file is received at step 340. The worker process 212 may access the content of the file, and send the content to search service 210 for indexing, which is shown at step 350. Other files, including nonencrypted files, may also be crawled to generate an index.

The index may contain one or more index records that correspond to each of the files that have been indexed. A requester may request to access a portion of the index. If this portion of the index contains an index record that corresponds to an encrypted file, the requester's permissions may be verified. A security identifier (e.g., security descriptor) may be associated with each index record that corresponds to an encrypted file, wherein the security identifier may allow read access only to the requesters who can both access and decrypt the encrypted file. If it is determined that the requester has appropriate permission (e.g., can both access and decrypt the encrypted file), the requester may be allowed to access that portion of the index that contains content of an encrypted file. If not, the requester may not be allowed to access this portion of the index.

The index that is generated using a method, such as that described above, may be used for more than one user who can log on to a particular computer or network. Traditionally, an index would have been created for each user, as each user would have special and distinct permissions as far as access to certain files. Because index records associated with encrypted files may have security identifiers allowing read access to only those users with certain permissions, this method of indexing an encrypted file may be used to allow for a single index for multiple users.

Figure 4:
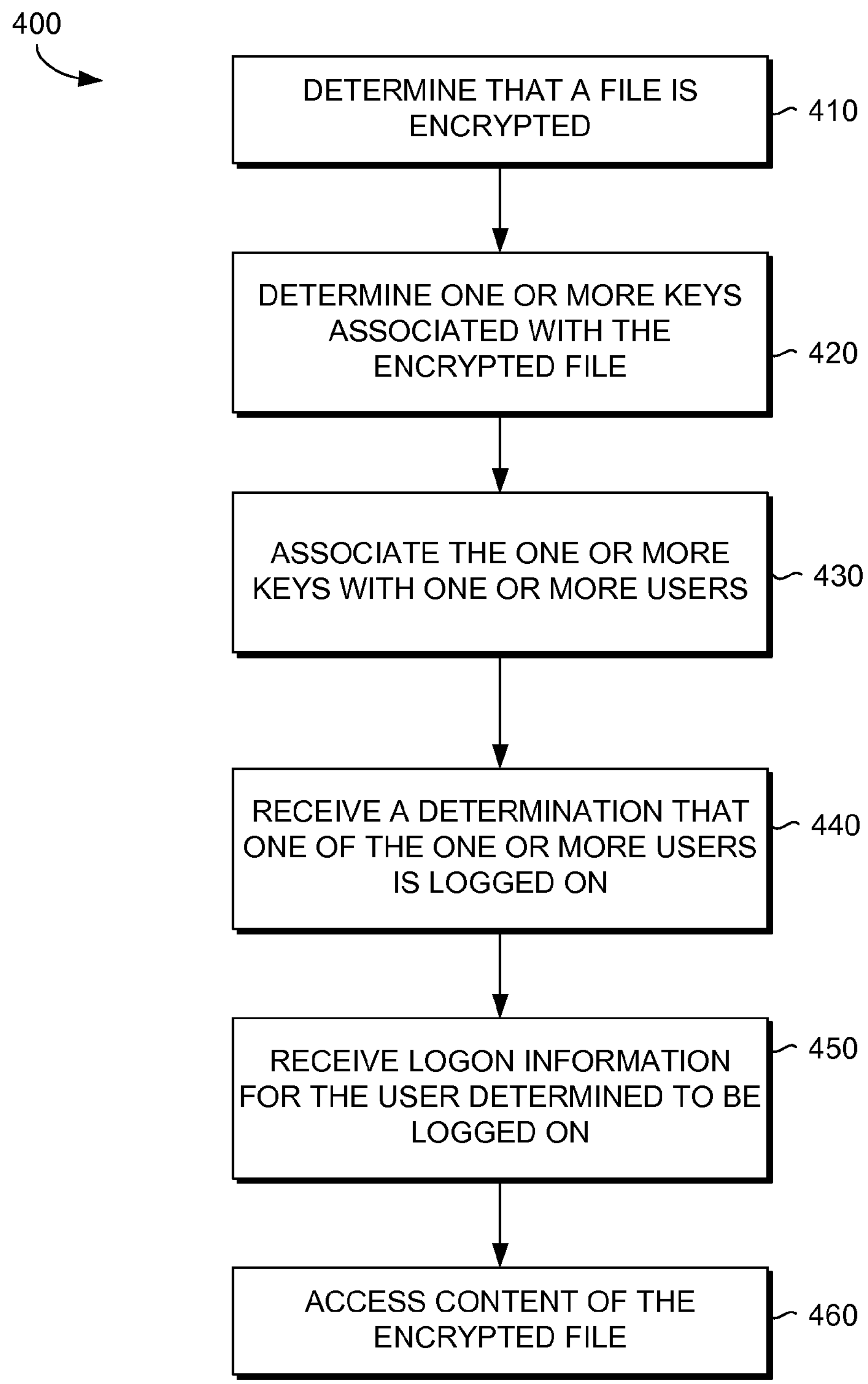
FIG. 4 is a flow diagram illustrating a method for accessing content of an encrypted file by impersonating users associated with the encrypted file, in accordance with an embodiment of the present invention.

FIG. 4 is a flow diagram illustrating a method 400 for accessing content of an encrypted file by impersonating users associated with the encrypted file, in accordance with an embodiment of the present invention. While FIG. 4 illustrates steps taken by worker process 212, it will be appreciated by one skilled in the art that one or more of the steps shown may be taken or performed by one or more other systems or processes, such as, but not limited to search service 210 or a filter process. Further, it will be appreciated that while search service 210 may be providing information to worker process 212 in the illustrated embodiment, any other process or system may provide this information.

Initially, it is determined that a file is encrypted at step 410. One or more keys associated with the encrypted file are determined at step 420, and as previously mentioned, the one or more keys may be associated with one or more users who own the keys at step 430. To determine one or more keys associated with the encrypted file, certificate key hashes may be used. A certificate key hash is a special value uniquely generated from a key. To determine the one or more users, a mapping may be consulted to make this association, and the mapping may be updated immediately if there is new or updated logon information, such as a key. At step 440, a determination that at least one of the one or more users is logged on is received. The determination may be made by search service 210 in one embodiment, but by another service or process in another embodiment. Logon information is received at step 450 for the user determined to be logged on. More than one user may be logged on, but one is chosen to be impersonated in order to access content of a particular encrypted file. Finally, at step 460, content of the encrypted file is accessed using the logon information.

Figure 5:
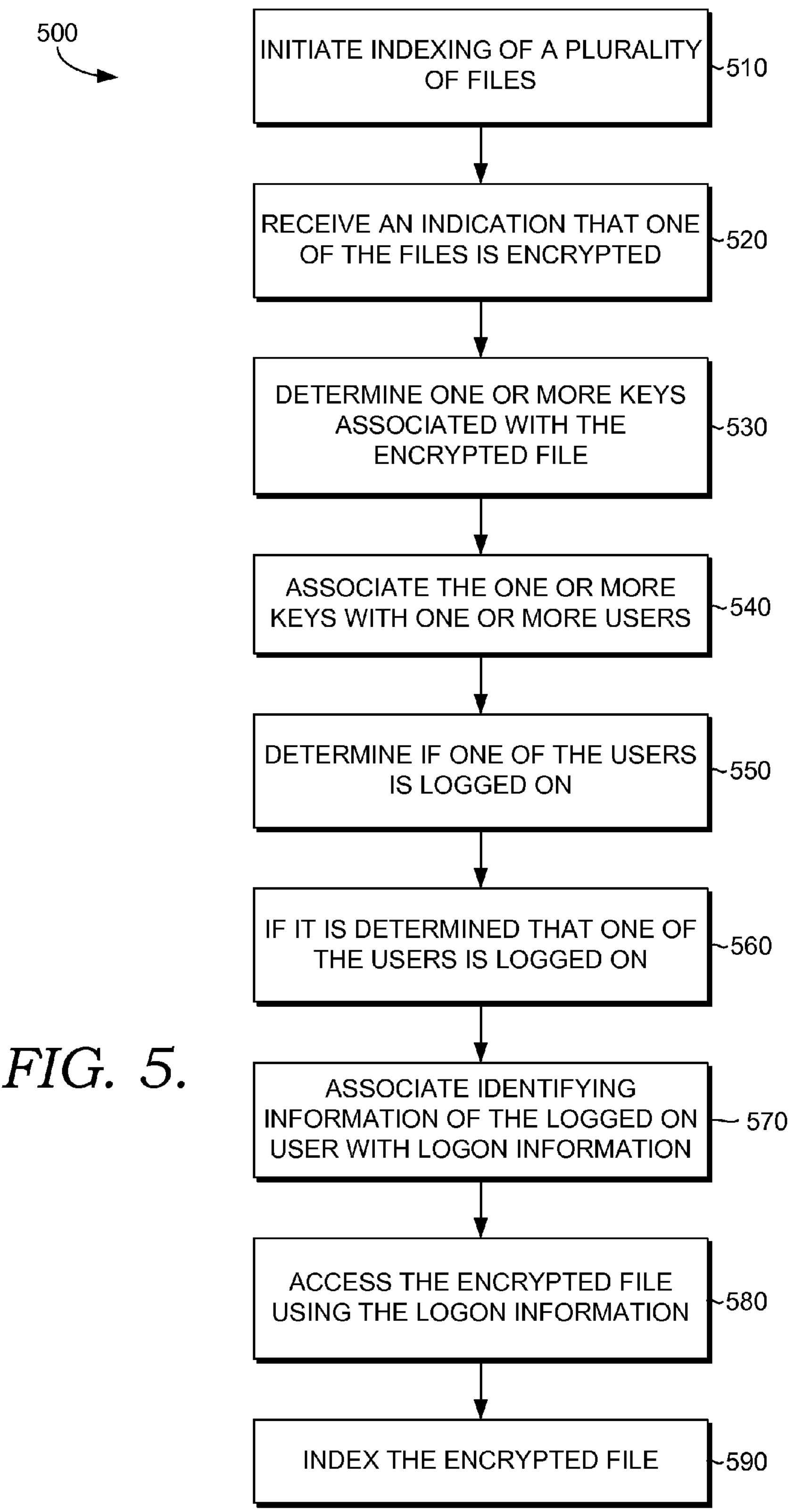
FIG. 5 is a flow diagram illustrating a method for indexing an encrypted file by impersonating a user associated with the encrypted file, in accordance with an embodiment of the present invention.

Referring to FIG. 5, a flow diagram is shown illustrating a method 500 for indexing an encrypted file by impersonating a user associated with the encrypted file, in accordance with an embodiment of the present invention. The method of FIG. 5, as will be appreciated by one of ordinary skill in the art, may be performed by one system, such as search service 210, or may be performed by another or even by more than one system or process. Initially, indexing of a plurality of files located in a directory, for example, is initiated at step 510. An indication is received at step 520 that one of the files in the directory being indexed is encrypted. One or more keys associated with the encrypted file are determined at step 530 and are associated with one or more users at step 540 so that it may be determined which users have appropriate permission to access and decrypt the encrypted file. At step 550, it is determined whether one of the users is logged on. As long as one of the users is logged on, the encrypted file can be accessed by impersonating that user.

At step 560, if it is determined that one of the users is logged on, identifying information of the logged on user is associated with logon information for that user, as indicated at step 570. Logon information may include, for example, a logon token and handle for the particular user. At step 580, the encrypted file is accessed using the logon information of the user, and the index may then be generated, as shown by step 590, by indexing the encrypted file and other files, whether encrypted or nonencrypted. If more than one process is used to perform the method of FIG. 5, the logon token may be duplicated by system service 210, for example, and sent to worker process 212 for use in decrypting the encrypted file. If, however, none of the users are logged on, the process of determining whether a user is logged on may be repeated after a predetermined amount of time has passed. Further, if a new user logs on, it may be determined whether that user is one of the users who was previously determined to be associated with an encrypted file (e.g., associated with a key that is associated with an encrypted file). This provides great efficiency to the process by eliminating the need to redo previous steps of determining users associated with the encrypted file. As described above, identifiers may be attached to the transaction, which allows for the determination of whether a newly logged on user was previously identified as being associated with a particular encrypted file. There may be more than one transaction open at a time, and therefore the newly logged on user may be checked against each identifier of each transaction. If it is then determined that one or more users are logged on, steps 570, 580, and 590 may then be taken to index the encrypted file.

As described above, a request may be received by a requester, who may or may not be a user associated with the encrypted file, to access at least a portion of the index, such as a portion corresponding to an index record that is associated with an encrypted file. It may be determined if that requester has appropriate permission to access that portion of the index. The appropriate permission may be ascertained if the requester has both access and decryption rights or privileges associated with the encrypted file. If it is determined that the requester has the appropriate permission, the requester may be allowed to access that portion of the index. If not, the requester may not be allowed to access that portion of the index. As previously mentioned, this eliminates the threat of dictionary attacks or the like, wherein a user without both access and decryption rights to a particular encrypted file may not be able to ascertain the contents of that file.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the methods. It will be understood that certain features and sub-combinations are of utility and may be employed without reference to other features and sub-combinations. This is contemplated by and is within the scope of the claims.

What is claimed is:

1. A computer-implemented method for indexing an encrypted file by impersonating a user associated with the encrypted file, the method comprising:

receiving a determination that a file is encrypted;

receiving identifying information for one or more users, wherein the one or more users correspond to one or more keys associated with the encrypted file;

determining that at least one of the one or more users is logged on;

based on being logged on, impersonating the at least one of the one or more users to receive content of the encrypted file; and indexing the encrypted file based on at least a portion of the received content.

2. The method of claim 1, further comprising:

initiating indexing of a directory, wherein the directory contains one or more files; and creating a directory transaction for a location of the directory.

3. The method of claim 1, further comprising:

receiving a notice that the file has changed, wherein the file has changed upon an occurrence of one or more of a security change associated with the file, a content change of the file, or logon information change associated with the file.

4. The method of claim 2, further comprising:

crawling the directory; and creating a file transaction for each of the one or more files in the directory.

5. The method of claim 1, further comprising:

receiving a new key for a member of the one or more users; and updating a list that includes associations of the one or more users to the keys.

6. The method of claim 1, further comprising:

indexing one or more nonencrypted files; and generating an index, wherein the index includes index records that correspond to each of the files that have been indexed.

7. The method of claim 6, wherein the index is used by more than one user.

8. The method of claim 6, further comprising:

associating the encrypted file with a corresponding index record.

9. The method of claim 8 further comprising:

receiving a request from a requester to access at least a portion of the index, wherein the at least a portion of the index contains the index record corresponding to the encrypted file; and determining if the requester has appropriate permission to access the at least a portion of the index.

10. The method of claim 9, wherein the appropriate permission includes the capabilities of accessing and decrypting the encrypted file.

11. The method of claim 9, further comprising:

if it is determined that the requester has the appropriate permission, allowing the requester to access the at least a portion of the index containing the index record corresponding to the encrypted file.

12. The method of claim 9, further comprising:

if it is determined that the requester does not have the appropriate permission, not allowing the requester to access the at least a portion of the index containing the index record corresponding to the encrypted file.

13. A computer-implemented method for accessing content of an encrypted file by impersonating users associated with the encrypted file, the method comprising:

determining that a file is encrypted;

determining one or more keys associated with the encrypted file;

associating the one or more keys with one or more users;

receiving a determination that at least one of the one or more users is logged on;

receiving logon information for the at least one of the one or more users determined to be logged on; and using the logon information, impersonating the at least one of the one or more users in order to access the encrypted file.

14. The method of claim 13, further comprising:

associating the encrypted file with an index record, wherein each of the index records correspond to each of the files that have been indexed.

15. The method of claim 14, further comprising:

determining a security identifier for the index record corresponding to the encrypted file, wherein the security identifier allows read access only to the one or more users who can access and decrypt the encrypted file.

16. One or more computer-storage media having computer-executable instructions embodied thereon that, when executed, perform a method for indexing an encrypted file by impersonating a user associated with the encrypted file, the method comprising:

initiating indexing of a directory containing a plurality of files;

receiving an indication that one of the plurality of files in the directory is encrypted;

determining one or more keys associated with the encrypted file;

associating the one or more keys with one or more users;

determining if at least one of the one or more users is logged on; and if it is determined that the at least one of the one or more users is logged on, impersonating a logged on user using a logon token handle associated with the logged on user, based on impersonating the logged on user, accessing the encrypted file, and indexing the encrypted file.

17. The computer-storage media of claim 16, further comprising:

if it is determined that none of the one or more users are logged on, waiting until a predetermined amount of time has passed, and determining that the at least one of the one or more users is logged on.

18. The computer-storage media of claim 17, further comprising:

accessing the encrypted file using the logon information for the logged on user; and indexing the encrypted file.

19. The computer-storage media of claim 16, further comprising:

receiving a request by a requester to access at least a portion of the index;

determining if the requester has appropriate permission to access the at least a portion of the index;

if it is determined that the requester has the appropriate permission, allowing the requester to access the at least the portion of the index; and if it is determined that the requester does not have the appropriate permission, not allowing the requester to access the at least the portion of the index.

20. The computer-storage media of claim 19, wherein the requester has the appropriate permission if the requester can access and decrypt the encrypted file corresponding to the at least the portion of the index.

* * * * *